US012627694B2

(12) United States Patent
Burton et al.

(10) Patent No.: US 12,627,694 B2
(45) Date of Patent: May 12, 2026

(54) DNS EARLY THREAT RESPONSE

(71) Applicant: Infoblox Inc., Santa Clara, CA (US)

(72) Inventors: Renée Carol Burton, Seattle, WA (US); Darin Johnson, Laurel, MD (US)

(73) Assignee: Infoblox Inc., Santa Clara, CA (US)

( * ) Notice: Subject to any disclaimer, the term of this patent is extended or adjusted under 35 U.S.C. 154(b) by 34 days.

(21) Appl. No.: 18/679,160

(22) Filed: May 30, 2024

(65) Prior Publication Data

US 2024/0422185 A1 Dec. 19, 2024

Related U.S. Application Data

(60) Provisional application No. 63/521,437, filed on Jun. 16, 2023.

(51) Int. Cl.
H04L 9/40 (2022.01)

(52) U.S. Cl.
CPC ...... H04L 63/1425 (2013.01); H04L 63/0236 (2013.01); H04L 63/1416 (2013.01)

(58) Field of Classification Search
CPC ............. H04L 63/1425; H04L 63/0236; H04L 63/1416; H04L 63/1408; H04L 63/14
USPC .......................................................... 726/22
See application file for complete search history.

(56) References Cited

U.S. PATENT DOCUMENTS

| | | | | |
|---|---|---|---|---|
| 8,555,388 B1 * | 10/2013 | Wang | ...................... | H04L 69/22 |
| | | | | 713/188 |
| 8,826,434 B2 | 9/2014 | Merza | | |

| | | | | |
|---|---|---|---|---|
| 8,990,933 B1 * | 3/2015 | Magdalin | ................ | G06F 21/85 |
| | | | | 709/229 |
| 10,498,751 B2 * | 12/2019 | Yu | ....................... | H04L 63/1416 |
| 2008/0086574 A1 * | 4/2008 | Raciborski | .......... | H04L 61/4541 |
| | | | | 709/245 |
| 2011/0283357 A1 * | 11/2011 | Pandrangi | ........... | H04L 63/1416 |
| | | | | 726/22 |
| 2015/0195291 A1 | 7/2015 | Zuk | | |
| 2017/0041333 A1 * | 2/2017 | Mahjoub | ............. | H04L 43/0876 |
| 2017/0093802 A1 * | 3/2017 | Norum | ................ | H04L 63/0428 |
| 2019/0028509 A1 * | 1/2019 | Cidon | ................. | H04L 63/1425 |
| 2020/0053119 A1 * | 2/2020 | Schnieders | .......... | G06V 10/761 |
| 2020/0106790 A1 * | 4/2020 | Bagnall | ............... | H04L 63/1416 |

(Continued)

OTHER PUBLICATIONS

Bilge et al., Exposure: Finding Malicious Domains Using Passive DNS Analysis, Conference: Proceedings of the Network and Distributed System Security Symposium, NDSS, Jan. 2011, pp. 1-17.

(Continued)

*Primary Examiner* — Kaylee J Huang
(74) *Attorney, Agent, or Firm* — Van Pelt, Yi & James LLP

(57) ABSTRACT

Various techniques for providing a DNS Early Threat Executive Response System (DETERS) are disclosed. In some embodiments, DETERS is a comprehensive DNS threat detection, response, and reporting system with a modular analytics architecture that allows for early detection of suspicious activity in near real-time. DETERS can identify threats before they are able to spread or compromise systems. DETERS uses a combination of streaming and batch processing, as well as historical DNS information. The DNS-centric design allows a DNS resolver to quickly mitigate threats and for the reporting system to alert users allowing them to take further actions that are reflected in the DNS resolver response policy.

20 Claims, 6 Drawing Sheets

(56) References Cited

U.S. PATENT DOCUMENTS

| | | |
|---|---|---|
| 2020/0106791 A1 | 4/2020 | Bagnall |
| 2020/0204581 A1* | 6/2020 | Manadhata ......... H04L 61/4511 |
| 2022/0263828 A1* | 8/2022 | Brandel .............. H04L 63/1433 |
| 2023/0112092 A1 | 4/2023 | Vadym |
| 2023/0118679 A1* | 4/2023 | Mayer ................. H04L 63/1433 |
| | | 707/706 |
| 2024/0073225 A1* | 2/2024 | Chiaraviglio ....... H04L 63/1416 |
| 2024/0171591 A1* | 5/2024 | Mitchell ............. H04L 61/4511 |

OTHER PUBLICATIONS

Hao et al., Monitoring the Initial DNS Behavior of Malicious Domains, IMC'11, Nov. 2-4, 2011, Berlin, Germany, pp. 269-278.
Hesselman et al., Increasing DNS Security and Stability through a Control Plane for Top-Level Domain Operators (paper postprint), 2016.
Patsakis et al., Encrypted and Covert DNS Queries for Botnets: Challenges and Countermeasures, Preprint submitted to Computers and Security, Sep. 17, 2019, pp. 1-28.
Zhauniarovich et al., A Survey on Malicious Domains Detection through DNS Data Analysis, ACM Computing Surveys, vol. 1, No. 1, Article 1. Publication date: May 2018, pp. 1-35.

* cited by examiner

Secondary Detectors

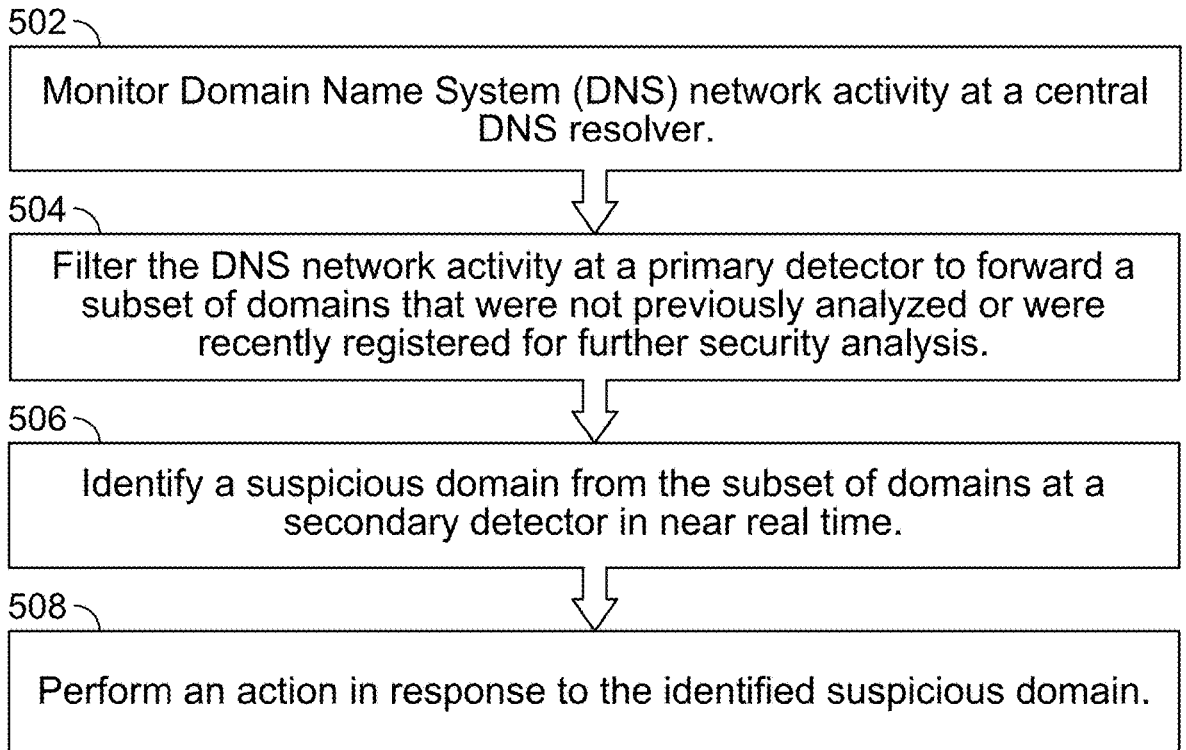

502

Monitor Domain Name System (DNS) network activity at a central DNS resolver.

504

Filter the DNS network activity at a primary detector to forward a subset of domains that were not previously analyzed or were recently registered for further security analysis.

506

Identify a suspicious domain from the subset of domains at a secondary detector in near real time.

508

Perform an action in response to the identified suspicious domain.

FIG. 5

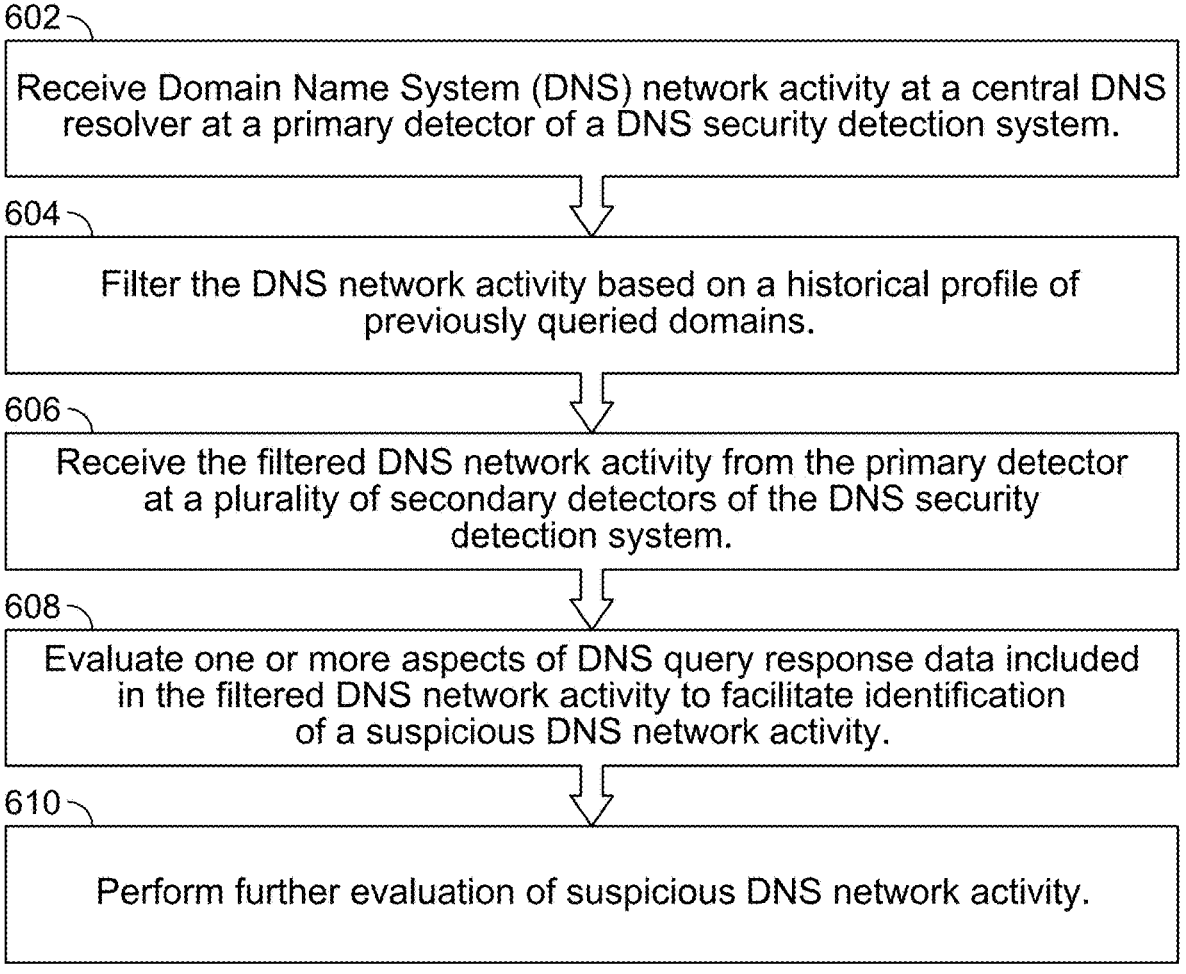

602

Receive Domain Name System (DNS) network activity at a central DNS resolver at a primary detector of a DNS security detection system.

604

Filter the DNS network activity based on a historical profile of previously queried domains.

606

Receive the filtered DNS network activity from the primary detector at a plurality of secondary detectors of the DNS security detection system.

608

Evaluate one or more aspects of DNS query response data included in the filtered DNS network activity to facilitate identification of a suspicious DNS network activity.

610

Perform further evaluation of suspicious DNS network activity.

FIG. 6

DNS EARLY THREAT RESPONSE

CROSS REFERENCE TO OTHER APPLICATIONS

This application claims priority to U.S. Provisional Patent Application No. 63/521,437 entitled DNS EARLY THREAT RESPONSE filed Jun. 16, 2023, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRAWINGS

Various embodiments of the invention are disclosed in the following detailed description and the accompanying drawings.

FIG. 5 is a flow diagram for a DNS early threat response system in accordance with some embodiments.

FIG. 6 is another flow diagram for a DNS early threat response system in accordance with some embodiments.

DETAILED DESCRIPTION

Figure 1:
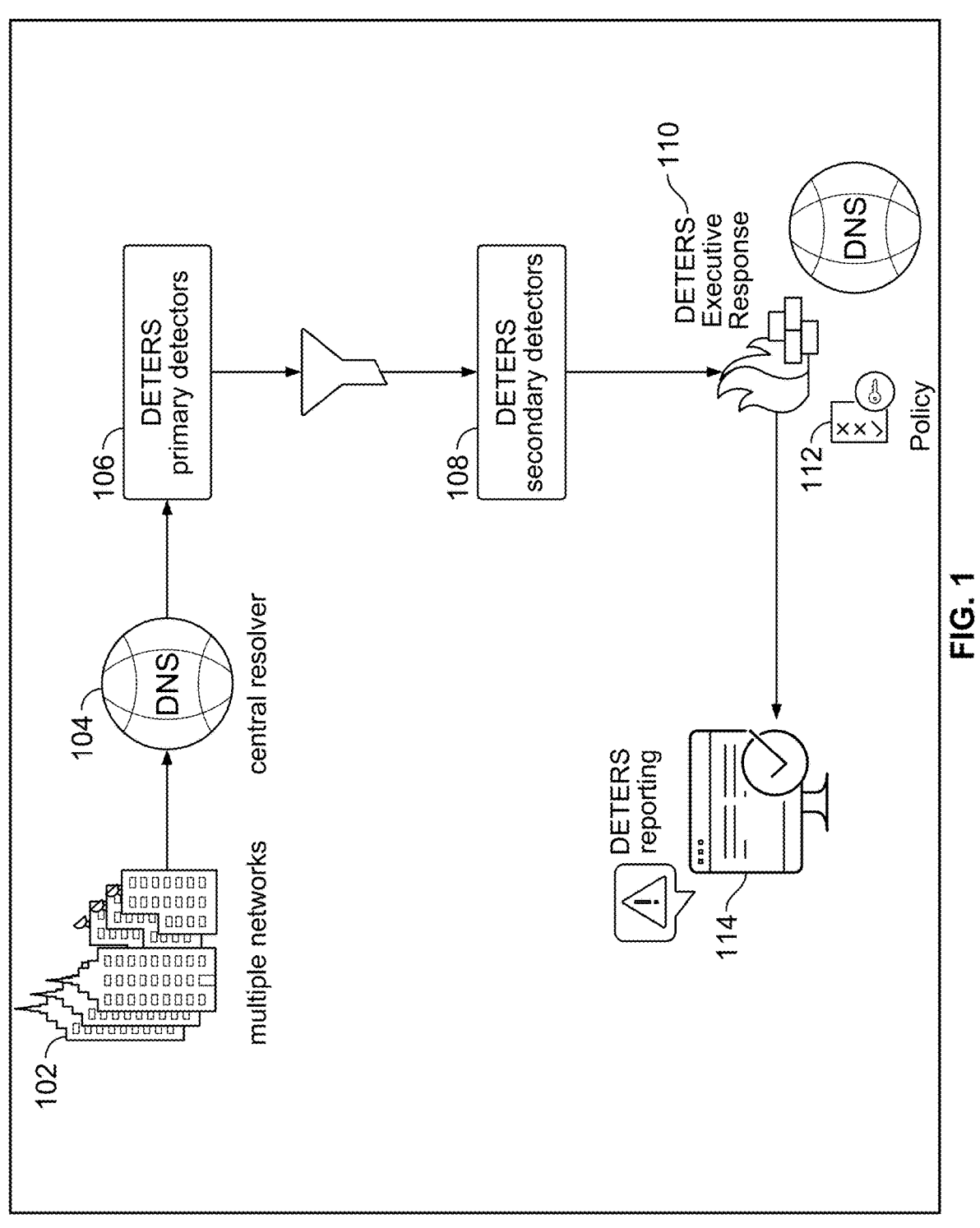
FIG. 1 shows an overall dataflow of a DNS Early Threat Response System (DETERS) in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names (FQDNs)). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain (e.g., an NX Domain response is returned by DNS servers for a non-existent domain).

Overview of Techniques for a DNS Early Threat Executive Response System (DETERS)

Various techniques for providing a DNS Early Threat Executive Response System (DETERS) are disclosed. The disclosed DETERS solution can be implemented in various system, process, and/or computer program embodiments, such as will be further described below with respect to various embodiments.

DETERS is a comprehensive DNS threat detection, response, and reporting system with a modular analytics architecture that allows for early detection of suspicious activity in near real-time. The purpose of the system is to identify threats before they are able to spread or compromise systems. To accomplish this, DETERS uses a combination of streaming and batch processing, as well as historical DNS information. The DNS-centric design allows a DNS resolver to quickly mitigate threats and for the reporting system to alert users allowing them to take further actions that are reflected in the DNS resolver response policy. Three major functions of DETERS are as follows: (1) detect; (2) respond; and (3) report.

DETERS is designed as a security architecture to support a recursive DNS resolver which serves one or many independent networks. DETERS consumes DNS query-response data from the recursive resolver. The resolver is able to distinguish from which network a query originated and it forwards this information to DETERS. That is, when the resolver serves DNS queries for two distinct networks, A and B, it provides sufficient information to separate the queries from network A and network B. This information is used by the DETERS detector systems, as shown in FIG. 1 below, which serve to reduce the large volume of DNS traffic to a smaller subset and then identify suspicious behavior in the remaining queries. From the suspicious behavior, DETERS has a response system which is configurable for each network which determines how the resolver handles all future queries. Following the policy application, the DETERS reporting system will aggregate and alert on the suspicious behavior.

Thus, new and improved techniques for DETERS are disclosed. Example embodiments for a DETERS solution are further described below.

Example System Embodiments for a DNS Early Threat Executive Response System (DETERS)

FIG. 1 shows an overall dataflow of a DNS Early Threat Response System (DETERS) in accordance with some embodiments. Referring to FIG. 1, DETERS consumes DNS from a recursive resolver shown as central resolver 104, from potentially many disparate networks shown as multiple networks 102, filters through the detector system including DETERS primary detectors 106 and DETERS secondary detectors 108 as will be further described below, executes a response on high risk domains as shown at 110 based on a policy 112 (e.g., a DNS security policy), and provides prioritized alerting and reporting as shown at 114.

DETERS is designed for various use cases in which, for example, a near real-time response is desired and in which there is no previous decision to rely upon. Spear phishing is one example of the type of problem that DETERS is able to effectively and efficiently solve (e.g., for enterprise networks of companies/its employees/users that may be targeted by spear phishing or other/similar attacks). In a spear phishing attack, a sophisticated actor will register a domain and may use it very shortly after in an attack against specific user groups, for example, employees of a targeted company. For example, the attacker will attempt to convince the user to click on a URL containing the spear phishing domain and ultimately compromise the user's system or steal their credentials (e.g., which the attacker can then use for other malicious/nefarious/undesired activities, such as exfiltration of data from the user's devices and/or other devices on the enterprise network of the targeted company). Spear phishing is distinct from general phishing attacks in that it targets a specific user or a specific set of users and, as a consequence, has a smaller data trail in DNS.

However, in existing, traditional systems based on DNS, detection of such threats is typically delayed due to the sheer volume of data (e.g., including DNS data) and the complexity of the attacks.

Figure 2:
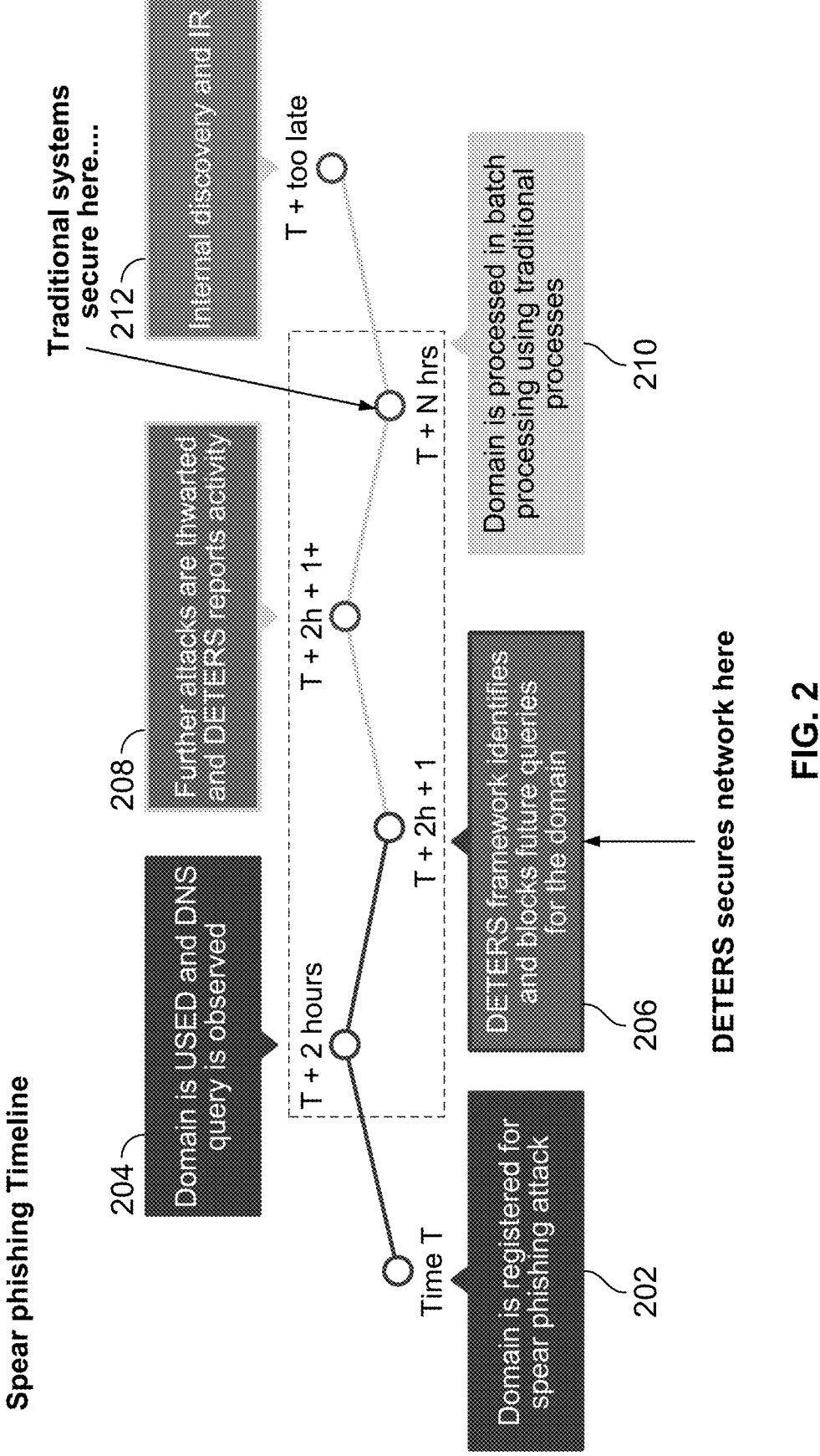
FIG. 2 illustrates a DETERS spear phishing use case timeline in accordance with some embodiments.

FIG. 2 illustrates a DETERS spear phishing use case timeline in accordance with some embodiments. As shown in this example implementation, DETERS can identify the spear phishing domain shortly after it is put into use, such as shown in this timeline within one minute.

Referring to FIG. 2, a timeline of a sophisticated spear phishing attack and the comparison between the time-to-detect for DETERS and traditional systems are shown for this spear phishing use case. As shown at 202, a domain (e.g., a newly registered domain) is registered for a spear phishing attack. At 204, the newly registered domain is used and a DNS query is observed. At 206, the disclosed DETERS solution (e.g., also referred to simply as DETERS) identifies and blocks future queries for the newly registered domain (e.g., within one minute after the newly registered domain is first used/queried). At 208, further attacks are effectively thwarted and DETERS reports the activity.

In comparison with traditional, existing DNS systems, as shown at 210, the domain is initially processed in batch processing after N hours of first use of the newly registered domain (as compared with detection within 1 minute after first use by DETERS). At 212, an internal discovery of the newly registered domain based on the batch processing is performed, effectively/potentially too late for a given enterprise(s)/user(s) targeted by the spear phishing attack using the newly registered domain. Specifically, because the number of queries observed at a large multi-enterprise resolver can often exceed tens of billions per day, conventional processing will generally be resource intensive and cost prohibitive (e.g., as shown at 210). As a result, it is typically handled in batch processing with some delay.

In order to provide near real-time detection using the disclosed DETERS solution, the system vastly reduces the volume processed by complex algorithms. As such, DETERS uses a primary filter (e.g., also referred to herein as a primary filter/detector, such as shown at 106 in FIG. 1) based on the historical observation of a domain in a DNS query. Only domains that are newly observed are forwarded for further processing. A recursive resolver alone is not able to determine that the domain is being seen for the first time, and thus, an external system provided by DETERS is used to make that determination. DNS query logs are sent from the resolver to DETERS, which subsequently updates DNS policy information available to the resolver (e.g., the resolver as shown at 104 in FIG. 1).

Figure 3:
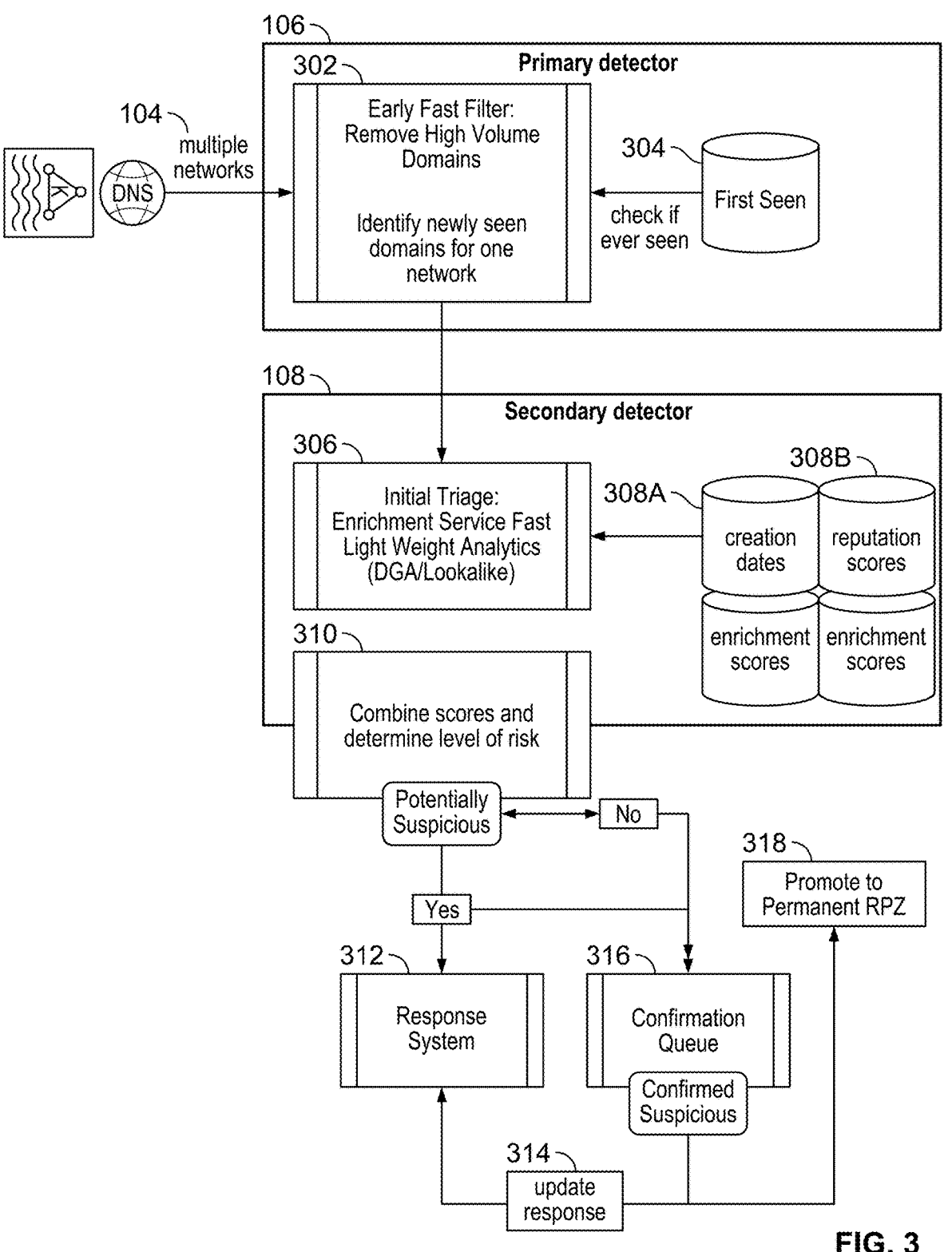
FIG. 3 is a logic flow for the DETERS primary detection of suspicious domains in accordance with some embodiments.

While a primary filter uses historical observation data, DETERS also leverages cascading filters (e.g., also referred to herein as secondary filters/detectors, such as shown at 108 in FIG. 1) to continually reduce the data size, allowing it to apply increasingly complex algorithms and to facilitate a rapid threat classification, such as shown in FIG. 3 as will now be described.

FIG. 3 is a logic flow for the DETERS primary detection of suspicious domains in accordance with some embodiments. DETERS primary detectors consume DNS query response data from many networks and reduce it to a small volume for use by secondary detectors. In this instance, they utilize aggregate tables of domains seen over all networks (e.g., multiple networks as seen from DNS queries at a central DNS resolver such as shown at 104), over all time, as well as domain enrichment to filter the large volumes to manageable sizes as will now be further described below.

Referring to FIG. 3, the first (primary) detector 106 checks and removes commonly observed domains that are new to the network (e.g., enterprise network) as shown at 302 to identify a subset of domains that are first seen domains as shown at 304. This reduces the traffic substantially (e.g., a reduction of DNS traffic by 98% based on experiments, as only about 2% of the domains are first seen domains). The second (secondary) detector 108 performs an initial triage (e.g., using an enrichment service with fast light weight analytics, such as for DGA and/or domain lookalike detection, etc.), and then checks the domains against registration databases 308A and by applying DNS reputation filters 308B; additional checks (not shown) can also be performed for other enrichments to help determine the likelihood of potentially suspicious domains. For instance, a lookalike or domain generation algorithm (DGA) filter (not shown) can be applied to further classify the domain as related to spear phishing or malware, such as shown at 306.

Once the primary and secondary detectors have identified a suspicious domain, or other suspicious activity, based on a combining of scores from the various filters/detectors to determine a risk level/score as shown at 310, it is passed to the DETERS response component as shown at 312. Otherwise (e.g., the domain was not determined to be potentially malicious), it is passed to a confirmation queue as shown at 316 for confirmation/validation or if it is determined to be suspicious, then it is also passed to the response system as shown at 314.

The DETERS response component is configured to perform responsive actions (e.g., immediate/rapid responsive actions) to mitigate the potential attack based on customized settings for the network. For example, the domain in the response may be configured to block further DNS queries for some period of time, such as shown at 318 (e.g., promoting it to the permanent response policy zone (RPZ), so that recursive resolvers return possibly modified results, and by modifying a result, access to the corresponding host can be blocked). In this example implementation, the DETERS response is customizable for every subnetwork served by the DNS resolver. The response subsystem manages suspicious domain lists and network configurations, and provides the interface by which the DNS resolver can process future requests. As another example, the DETERS response system can also force a flush of the resolver's cache ensuring that future requests for the domain are mitigated.

In addition, the domain is submitted to a confirmation queue to obtain additional information, such as a scanning service to discover open ports, screenshots, and/or other information to substantiate or refute suspiciousness of the domain as shown at 316. For instance, if the potential spear phishing domain was determined to be a lookalike domain but was also determined to have an SSL certificate signed by the entity (e.g., company) that owned the actual domain and the lookalike, then it can be refuted. In contrast, if the domain was determined to have an SSL certificate from a different signing authority and a significantly different infrastructure, then it would be substantiated. Refuted domains can then be submitted back to the response system for negation of blocking and reporting. Substantiated domains can be promoted to long term blocking services outside the DETERS response system as shown at 318.

Finally, the DETERS reporting component summarizes and prioritizes the notification of events. In the case of the spear phishing attack, it can highlight that an attack likely occurred at a specific time, on a specific device, and summarize subsequent mitigations. The reporting component leverages asset management systems that allow the administrator to pinpoint affected devices for follow up remediation.

Each of these above-described components will be further described below.

While the above-described DETERS techniques and disclosed system can be applied to include security analysis based on newly registered domains, the DETERS techniques and system can be similarly applied to include other types of anomaly detection, including, for example, suspicious behavior by DNS clients and/or DNS name servers.

DETERS can operate in multiple environments. As an example, DETERS can be implemented in a cloud environment in which the networks are unrelated organizations. As another example, DETERS can be implemented in an on-premises (on-prem) environment of an organization (e.g., an enterprise environment, a university environment, a government environment, etc.) where the distinction is made between subnetworks of the organization. Specifically, in an enterprise environment, the networks can be different operating elements, such as engineering and sales departments, or in a university environment, the distinction can be made on academic departments. Similarly in a hybrid environment, DETERS can be utilized for early threat detection when comparing cloud and on-prem traffic within and across networks.

DETERS Detection Component

In an example implementation, the detection component of DETERS identifies suspicious domain activity in a two-phase approach in order to provide near real-time protection for DNS resolvers and clients. The input to this component is DNS query data, or query-response data, coming from a DNS resolver (e.g., DNS resolver 104 as shown in FIGS. 1 and 3). Because the volume of DNS queries in an enterprise or multi-enterprise environment is typically extremely large, the first phase of the DETERS detection component processing (i.e., using a primary detector(s)) acts to substantially reduce the set of domains for further evaluation/processing. The second phase applies one or more detectors (i.e., using a secondary detector(s)) that further refine the output of phase 1 to provide further insight and prioritization for the downstream DETERS response system.

We first describe phase 1, used to reduce the overall volume and identify suspicious domains, and then describe the secondary detectors of phase 2. The goal of phase 1 is to significantly reduce the query volume (e.g., by about 98%), which facilitates a more effective and efficient processing of the remaining domains utilizing more time consuming checks, such as application programming interface (API) calls or Machine Learning (ML) models.

Phase 1. Primary Detectors

In an example implementation, the purpose of the primary detection phase is to reduce the overall volume of query activity so that it can be analyzed in near real-time during the secondary phase. For example, the DNS resolver may serve hundreds of distinct networks and receive billions of queries per day. In our experiments, the systems processed over 30 billion records per day. DETERS can identify threats that have not yet been detected through other existing, traditional DNS security solutions and techniques. In the case of malicious domains, this may be because the domain is newly registered or newly observed in the networks served by the DNS resolver. In other instances, it may be that the client is requesting unusual domains or DNS query types. In FIG. 3, we depict a possible decision flow for the suspicious recently registered domain use case, for example, domains used for spear phishing.

In this example implementation, as shown in FIG. 3, the DETERS detector framework utilizes historical information about domains to make decisions about a DNS query and identify suspicious domains. Specifically, the queried domain is checked against first a list of common domains in memory and an aggregate history of all domains resolved by the DNS resolver potentially, obtained elsewhere in a database cache if the domain is not present in the aggregate history table. If the domain appears in neither, then it is promoted to the secondary detector for further security analysis/processing, as will be further described below with respect to FIG. 4.

The primary detector is a rapid filter to remove domains that have been seen in customer networks long enough for appropriate determination of their behavior. At the final stage of the primary detectors, DETERS has identified domains based on new activity and domain age to nominate for additional checks at the secondary level.

Phase 2. Secondary Detectors

Figure 4:
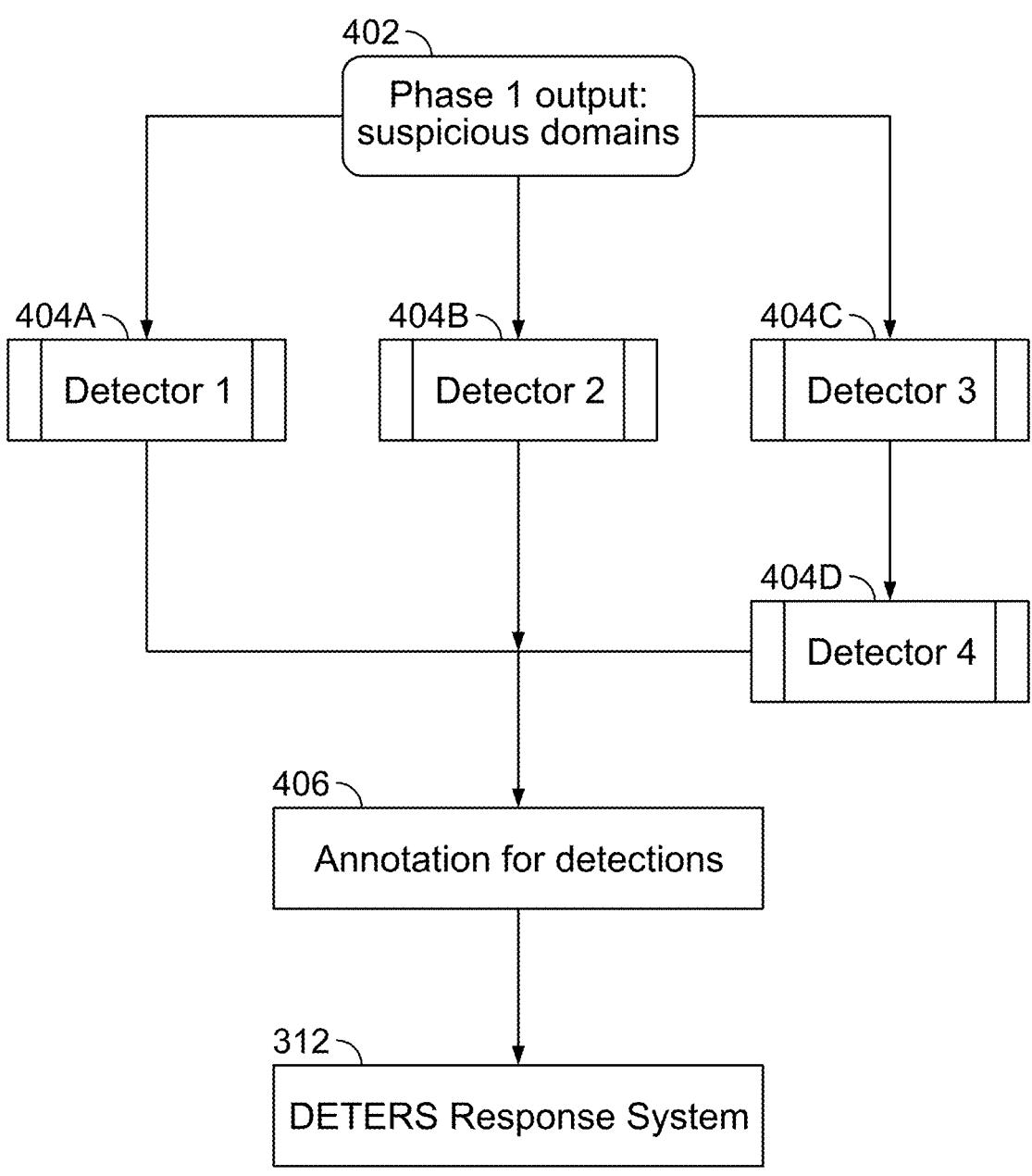
FIG. 4 illustrates the secondary detectors in DETERS that are responsible for refining the findings of the primary detectors, annotating those detections, and making the results available for the response system in accordance with some embodiments.

FIG. 4 illustrates the secondary detectors in DETERS that are responsible for refining the findings of the primary detectors, annotating those detections, and making the results available for the response system in accordance with some embodiments. In an example implementation, secondary detectors are modular and can act independently or in series, such as will be further described below with respect to FIG. 4. Each secondary detector can produce verdicts, can add annotation and/or properties to the detection, and can provide the results to the response system 312. For example, a secondary detector can evaluate any aspect of DNS query response data, including domain names, resolution IP addresses, and/or client IP addresses, etc.

Referring to FIG. 4, a plurality of secondary detectors 404A, 404B, 404C, and 404D for the DETERS system receive the phase 1 output of potentially suspicious domains as shown at 402 and perform an initial determination of whether the domain is suspicious. For example, the DETERS secondary detectors 404A-D can perform active checks on the domain, including creation date, reputation, and/or other enrichments, such as by applying heuristics and/or machine learning (ML) techniques. The DETERS secondary detectors will drop domains that are older than a certain period, such as older than 48 hours (e.g., or some other threshold time period can similarly be used for this processing). The remaining newly observed, newly registered domains are subject to further secondary detector filtering based on, for example, various reputation scores. Example reputation scores can include reputation analysis/scoring, such as based on an associated name server, TLD reputation (e.g., a bad TLD example includes .exe, .zip, etc.), and DGA or lookalike scores.

In this example implementation, the secondary detectors perform various automated analysis to classify domains as suspicious, likely benign, or unknown, and provide additional annotation about the domain's characteristics. The secondary detectors can be implemented as streaming algorithms. Individual analytics can be performed independent of DETERS, and DETERS can then provide the platform for which new analysis/classification techniques for DNS security can be applied. In this example, the secondary detectors are modular, and can be independent or part of a pipeline, such as shown with respect to Detector 1 at 404A and Detector 2 at 404B as well as with respect to Detector 3 at 404C and Detector 4 at 404D. Multiple detectors can consume the same data, and draw different conclusions about the same domain, or set of domains. For example, one detector may classify a domain as a suspicious lookalike domain, while another may classify that same domain as suspicious phishing, based on differing features used by the individual detectors.

As shown at 406, detectors annotate their conclusions with further properties specific to the domain and the specific detector. For example, a detector may classify a domain as suspicious with a further property such as DNS tunneling (DNST), traditional domain generation algorithm (DGA), registered DGA, or a lookalike to another established domain (e.g., a lookalike domain). Annotation includes information about the nature of the domain, or the query patterns of the domain, that led to the classification. Annotation can also include features like new registration or low reputation name servers.

Individual detectors can use various source and enrichment data, which allows them to detect and annotate domains for downstream use in DETERS and/or other DNS security products. In this example implementation, the DETERS detectors operate in a streaming environment, but can also operate on different configurations. These algorithms may use one or more DNS query-responses, and any data within the packet, as well as enrichment sources in the evaluation of a domain. These algorithms return near real-time classification of a domain, or set of domains.

Accordingly, the disclosed DETERS streaming detectors can facilitate providing near real-time classifications of domains with minimal latency. As such, this allows the response and reporting components of DETERS to act quickly.

In the spear phishing use cases, the primary detector identifies a recently registered domain that it deems to be suspicious. The secondary detectors can then individually process that domain and make distinct decisions. For example, suppose that the domain lnfoblox[.]com (e.g., where the uppercase I replaces the lowercase L in the domain name) was identified as suspicious by a reputation enrichment service, a second algorithm for lookalike detection identifies this further as a suspicious lookalike domain, while a third algorithm for DGA detection classifies this domain as not a DGA domain. The reputation and lookalike detectors can add annotation to the finding, including threat information that can be used for the DETERS response component to act on future queries for the domain, and for the DETERS reporting component to report on the activity. The domain is then placed into a confirmation queue (e.g., shown at 316 in FIG. 3), which will allow additional (e.g., non-real time) analytics to be further performed and can update the DETERS reporting and response systems when available. However, the DETERS response system can operate on the given information until such an update arrives.

DETERS Response Component

As similarly described above, the detected suspicious domains are made available to the DETERS response subsystem as shown at 312 in FIG. 4 for an executive action (e.g., responsive action, such as based on an enterprise DNS security policy or other configuration/policy). In this example implementation, these actions are configurable per network and modular in design. The response can include a variety of actions to further protect the affected networks, including one or more of the following: (1) network specific policies for blocking, logging, and/or redirecting future queries for a suspicious domain; (2) disabling DNS resolution altogether for an affected client or clients; (3) clearing cached results from the authoritative DNS server within the DNS resolver cache, thereby ensuring future queries are handled according to the DETERS policy actions; (4) forwarding the suspicious queries and enrichment data to downstream security systems for further review; and (5) applying a cross-network policy action for all further queries for a suspicious domain.

The DETERS response subsystem can be configured to perform additional actions given updates from the confirmation queue including the following: (1) all of the above-described actions; or (2) negating one or more of the above-described actions.

In this example implementation, the DETERS response is also modular in design and network owners can compose response policies (e.g., DETERS/DNS security policies) from individual secondary detectors. For example, in the case of a domain-based response, a network owner can configure the following executive/responsive actions: (1) block domain if recently registered and in a low reputation TLD, and log further queries for recently registered domains in high reputation TLDs; or alternatively, (2) block all newly observed lookalike domains with low reputation name servers.

As such, with the ability to compose analytics in different ways and apply different responses from the DNS resolver accordingly, the network administrator is able to have fine grained control of their security at the DNS layer.

Every further DNS query can create a log of the response that is then used by the DETERS reporting component to notify the network administrator of security events in their network.

Phase 3: Confirmation Queue

After the secondary detector has determined that a domain is potentially suspicious, the suspicious domain is sent to the Confirmation Queue component as shown at 316 in FIG. 3, Response component as shown at 312 in FIGS. 3 and 4, and Reporting component as shown at 114 in FIG. 1. In the Confirmation Queue, additional checks are performed to either confirm or refute the potentially suspicious nature of a domain. In an example implementation, these additional checks can include performing an analysis of additional sources of DNS traffic, analyzing SSL certificates, utilizing scanning services, and/or various other potentially more time consuming tasks that are generally not capable of being performed in real-time/near real-time.

In the example of the lookalike spear phishing domain infoblox[.]com, the Confirmation Queue additional analysis/processing may find the domain redirects to a login page using a combination of a URL Scanning service and computer vision, in which case the domain would be flagged as malicious and promoted to permanent RPZs (e.g., as shown at 318 in FIG. 3) as well as updating the reporting component that the domain requires some additional scrutiny.

However, it may be the case that the Confirmation Queue would determine that the domain infoblox[.]com resolves to the same IP as the real infoblox.com, and shares the same registration and SSL certificate information, so the system determines that the lookalike was a defensive registration by the company. In that case, the Response system is notified so it can change the policy, and the Reporting system is notified to lower the severity so that, for example, the Security Operations Center (SOC) can avoid spending unnecessary time in performing further scrutiny on this domain that was previously flagged as suspicious but subsequently refuted.

DETERS Reporting Component

In this example implementation, to support security operation centers (SOCs) as well as executive oversight, such as the chief information security officer (CISO), DETERS also provides a robust reporting component as shown at 114 in FIG. 1. The reporting serves both immediate alert notification and event summarization purposes. Similar to the above-described response component, the reporting component of DETERS can be implemented as fully configurable. While the response component controls responses of the DNS resolver, the reporting component is an independent channel to provide information to the network owner about events (e.g., DNS security related events detected by DETERS).

If we consider the spear phishing example, the DETERS reporting can be configured to send an alert to the network administrator that a possible targeted phishing attack has occurred. This alert can contain the relevant device, query, and timing information so the appropriate SOC can isolate and contain any damage from the event. The reporting can also aggregate further events, such as queries made for the domain by other devices, to ensure the security organization can receive the relevant information for a full understanding of the attack, including those attempts that were blocked by DETERS.

The reporting component receives updates from the confirmation queue and based off the additional information received, this may increase or decrease the severity of a previously sent alert. As such, the additional information can allow security organizations to reprioritize previous alerts as desired.

In addition, DETERS reporting can include a feedback loop that allows network administrators and security teams to devalue or refute detections. This feedback can impact all aspects of the DETERS system. For example, in the event of a reported false positive, DETERS can facilitate or perform the following actions: (1) send this information to the confirmation queue; (2) negate the current response policy, (3) return the DNS resolver to its prior state; (4) include the feedback into the detector framework to ensure it will not be detected again and that it is used to train detectors going forward; and (5) archive the related reports.

Various process embodiments for DETERS will now be further described below.

Example Process Embodiments for a DNS Early Threat Executive Response System (DETERS)

FIG. 5 is a flow diagram for a DNS early threat response system in accordance with some embodiments. In some embodiments, a process as shown in FIG. 5 is performed by a DETERS system (e.g., a primary detector 106, secondary detector 108, and/or other components), and techniques as similarly described above including the embodiments described above with respect to FIGS. 1-4.

At 502, monitoring Domain Name System (DNS) network activity at a central DNS resolver is performed, such as similarly described above with respect to FIGS. 1-4.

At 504, filtering the DNS network activity is performed at a primary detector to forward a subset of domains that were not previously analyzed or were recently registered for further security analysis, such as similarly described above with respect to FIGS. 1-4.

At 506, identifying a suspicious domain from the subset of domains at a secondary detector is performed in near real-time, such as similarly described above with respect to FIGS. 1-4.

At 508, an action is performed an action in response to the identified suspicious domain, such as similarly described above with respect to FIGS. 1-4. For example, responsive actions can include one or more of the following, such as similarly described above: (1) blocking the suspicious domain in near real-time at a DNS security platform, wherein the suspicious domain is blocked at least for a predetermined period of time; (2) blocking a spear phishing attack at a DNS security platform; (3) reporting the suspicious domain for a first network based on a DNS security policy associated with the first network; (4) generating an alert for the suspicious domain for a first network based on a DNS security policy associated with the first network; (4) performing further analysis of the suspicious domain to verify that the suspicious domain is malicious or a false positive; and/or (5) various other responsive actions or combinations thereof can similarly be performed.

FIG. 6 is another flow diagram for a DNS early threat response system in accordance with some embodiments. In some embodiments, a process as shown in FIG. 6 is performed by a DETERS system (e.g., a primary detector 106, secondary detector 108, and/or other components), and techniques as similarly described above including the embodiments described above with respect to FIGS. 1-4.

At 602, Domain Name System (DNS) network activity at a central DNS resolver is received at a primary detector of a DNS security detection system (e.g., the DETERS system), such as similarly described above with respect to FIGS. 1-4.

At 604, filtering the DNS network activity based on a historical profile of previously queried domains is performed, such as similarly described above with respect to FIGS. 1-4. For example, the primary detector can be configured to filter the DNS network activity based on client IP address historical records including one or more of the following: (1) time of day to detect a device anomaly, and (2) a compromised device and/or geolocation information.

At 606, receiving the filtered DNS network activity from the primary detector at a plurality of secondary detectors of the DNS security detection system is performed, such as similarly described above with respect to FIGS. 1-4.

At 608, evaluating one or more aspects of DNS query response data included in the filtered DNS network activity to facilitate identification of a suspicious DNS network activity is performed, such as similarly described above with respect to FIGS. 1-4. For example, one or more of the plurality of the secondary detectors can be configured to score each of the subset of domains based on one or more of the following: hosted in a bad top level domain (TLD), hosted with a bad name server based on reputation, a known bad ASN, associated with a DGA structure, associated with a domain lookalike structure, and/or other DNS related security analysis can be performed to evaluate any aspect of DNS query response data, including domain names, resolution IP addresses, and/or client IP addresses, etc., such as similarly described above with respect to FIG. 4.

At 610, further evaluation of suspicious DNS network activity is performed to verify that it is malicious or a false positive, such as similarly described above with respect to FIGS. 1-4. For example, additional security analysis can be performed on the suspicious domain using a confirmation queue to validate that the suspicious domain is malicious and to promote it to a longer term block or to determine that the domain is not suspicious and to not block the now validated as legitimate domain, such as similarly described above with respect to FIGS. 3 and 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor Domain Name System (DNS) network activity at a central DNS resolver;
filter the DNS network activity at a primary detector to forward a subset of domains that were not previously analyzed or were recently registered for further security analysis;
identify a suspicious domain from the subset of domains at a secondary detector in near real-time, comprising to:
filter, based on a reputation score, the subset of domains to obtain a set of filtered domains, wherein the reputation score includes one or more of the following: an associated name server reputation score, and/or a top-level domain (TLD) reputation score; and
confirm, based on a secure sockets layer (SSL) certificate information, a filtered domain of the set of filtered domains to obtain the suspicious domain; and
perform an action in response to the identified suspicious domain; and
a memory coupled to the processor and configured to provide the processor with instructions.

2. The system recited in claim 1, wherein the primary detector is configured to filter the DNS network activity based on a historical profile of previously queried domains.

3. The system recited in claim 1, wherein the primary detector is configured to filter the DNS network activity based on client IP address historical records including one or more of the following: (1) time of day to detect a device anomaly, and (2) a compromised device and/or geolocation information.

4. The system recited in claim 1, wherein the secondary detector is configured to score each of the subset of domains based on one or more of the following: hosted in a bad top level domain (TLD), hosted with a bad name server based on reputation, a known bad Autonomous System Name (ASN), associated with a domain generation algorithm (DGA) structure, and associated with a domain lookalike structure.

5. The system recited in claim 1, wherein the DNS network activity is filtered based on a network for a plurality of monitored enterprise, university, and/or government networks.

6. The system recited in claim 1, wherein a cloud resolver forwards the DNS network activity to a cloud-based DNS security.

7. The system recited in claim 1, wherein the processor is further configured to:
perform additional security analysis on the suspicious domain using a confirmation queue to validate that the suspicious domain is malicious and to promote the suspicious domain to a longer term block or to determine that the domain is not suspicious and to not block the now validated as legitimate domain.

8. The system recited in claim 1, wherein the processor is further configured to perform the following action in response to identification of the suspicious domain:
block the suspicious domain in near real-time at a DNS security platform, wherein the suspicious domain is blocked at least for a predetermined period of time.

9. The system recited in claim 1, wherein the processor is further configured to perform the following action in response to confirmation that the suspicious domain is malicious:
block a spear phishing attack at a DNS security platform.

10. The system recited in claim 1, wherein the processor is further configured to:
report the suspicious domain for a first network based on a DNS security policy associated with the first network.

11. A method, comprising:
monitoring Domain Name System (DNS) network activity at a central DNS resolver;
filtering the DNS network activity at a primary detector to forward a subset of domains that were not previously analyzed or were recently registered for further security analysis;
identifying a suspicious domain from the subset of domains at a secondary detector in near real-time, comprising:
filtering, based on a reputation score, the subset of domains to obtain a set of filtered domains, wherein the reputation score includes one or more of the following: an associated name server reputation score, and/or a top-level domain (TLD) reputation score; and
confirming, based on a secure sockets layer (SSL) certificate information, a filtered domain of the set of filtered domains to obtain the suspicious domain; and
performing an action in response to the identified suspicious domain.

12. The method of claim 11, wherein the primary detector is configured to filter the DNS network activity based on a historical profile of previously queried domains.

13. The method of claim 11, wherein the primary detector is configured to filter the DNS network activity based on client IP address historical records including one or more of the following: (1) time of day to detect a device anomaly, and (2) a compromised device and/or geolocation information.

14. The method of claim 11, wherein the secondary detector is configured to score each of the subset of domains based on one or more of the following: hosted in a bad top level domain (TLD), hosted with a bad name server based on reputation, a known bad Autonomous System Name (ASN), associated with a domain generation algorithm (DGA) structure, and associated with a domain lookalike structure.

15. The method of claim 11, wherein the DNS network activity is filtered based on a network for a plurality of monitored enterprise, university, and/or government networks.

16. The method of claim 11, wherein a cloud resolver forwards the DNS network activity to a cloud-based DNS security.

17. A computer program product embodied in a non-transitory computer readable medium and comprising computer instructions for:

monitoring Domain Name System (DNS) network activity at a central DNS resolver;

filtering the DNS network activity at a primary detector to forward a subset of domains that were not previously analyzed or were recently registered for further security analysis;

identifying a suspicious domain from the subset of domains at a secondary detector in near real-time, comprising:

filtering, based on a reputation score, the subset of domains to obtain a set of filtered domains, wherein the reputation score includes one or more of the following: an associated name server reputation score, and/or a top-level domain (TLD) reputation score; and confirming, based on a secure sockets layer (SSL) certificate information, a filtered domain of the set of filtered domains to obtain the suspicious domain; and performing an action in response to the identified suspicious domain.

18. The computer program product of claim 17, wherein the primary detector is configured to filter the DNS network activity based on a historical profile of previously queried domains.

19. The computer program product of claim 17, wherein the primary detector is configured to filter the DNS network activity based on client IP address historical records including one or more of the following: (1) time of day to detect a device anomaly, and (2) a compromised device and/or geolocation information.

20. The computer program product of claim 17, wherein the secondary detector is configured to score each of the subset of domains based on one or more of the following: hosted in a bad top level domain (TLD), hosted with a bad name server based on reputation, a known bad Autonomous System Name (ASN), associated with a domain generation algorithm (DGA) structure, and associated with a domain lookalike structure.

\* \* \* \* \*